(12) United States Patent
Kanayama

(10) Patent No.: US 8,154,262 B2
(45) Date of Patent: Apr. 10, 2012

(54) CONTROL SYSTEM PROVIDED WITH POWER SUPPLY UNIT OPERATING BASED ON OPERATION MODES INCLUDING STANDBY MODE

(75) Inventor: Mitsuhiro Kanayama, Takahama (JP)

(73) Assignee: Denso Corporation, Kariya (JP)

( * ) Notice: Subject to any disclaimer, the term of this patent is extended or adjusted under 35 U.S.C. 154(b) by 512 days.

(21) Appl. No.: 12/358,484

(22) Filed: Jan. 23, 2009

(65) Prior Publication Data

US 2009/0184700 A1 Jul. 23, 2009

(30) Foreign Application Priority Data

Jan. 23, 2008 (JP) ................... 2008-012688

(51) Int. Cl.
*G05F 1/00* (2006.01)
(52) U.S. Cl. .................................... 323/266
(58) Field of Classification Search .......... 363/242, 363/243, 266, 268, 269, 272–274, 282–284, 363/288; 323/266
See application file for complete search history.

(56) References Cited

U.S. PATENT DOCUMENTS

| | | | | |
|---|---|---|---|---|
| 6,713,992 B2 * | 3/2004 | Matsuo et al. | ................ | 323/266 |
| 6,850,047 B2 * | 2/2005 | Itabashi et al. | ................ | 323/284 |
| 7,038,430 B2 * | 5/2006 | Itabashi et al. | ................ | 323/224 |
| 7,057,378 B2 * | 6/2006 | Oyama et al. | ................ | 323/268 |
| 7,586,296 B2 * | 9/2009 | Kanayama | ................ | 323/282 |
| 2001/0022513 A1 | 9/2001 | Nokkonen | | |
| 2002/0126512 A1 | 9/2002 | Nakagawa et al. | | |

FOREIGN PATENT DOCUMENTS

| | | |
|---|---|---|
| DE | 102 55 433 A1 | 6/2004 |
| JP | 2-252007 | 10/1990 |
| JP | 5-38138 | 2/1993 |
| JP | 11-041825 | 2/1999 |
| JP | 2002-335668 | 11/2002 |
| JP | 2004-153931 | 5/2004 |
| JP | 2004-173481 | 6/2004 |
| JP | 2005-100037 | 4/2005 |
| JP | 2006-25527 | 1/2006 |

OTHER PUBLICATIONS

Japanese Office Action dated Oct. 6, 2009, issued in corresponding Japanese Application No. 2008-012688, with English translation.
Extended European Search Report (7 pgs.) dated Sep. 7, 2011 issued in corresponding European Application No. 08022412.4-1242.

* cited by examiner

Primary Examiner — Jeffrey Sterrett
Assistant Examiner — Gary Nash
(74) Attorney, Agent, or Firm — Nixon & Vanderhye P.C.

(57) ABSTRACT

A power supply unit for supplying electric current of a supply voltage to a control unit in an electronic control system has switching regulator dropping an input voltage to an intermediate voltage, a first series regulator producing electric current of the supply voltage from the intermediate voltage, and a second series regulator producing electric current of the supply voltage lower than electric current produced in the first series regulator. During the standby mode of the control unit, an FET of the switching regulator is locked to the on state to accumulate electric charge in a capacitor of a smoothing circuit, while an output transistor of the first series regulator is locked to the off state. When a wake-up condition is satisfied in the control unit, the FET starts the switching operation, and the output transistor immediately starts the driving operation while using the charge supplied from the capacitor.

17 Claims, 9 Drawing Sheets

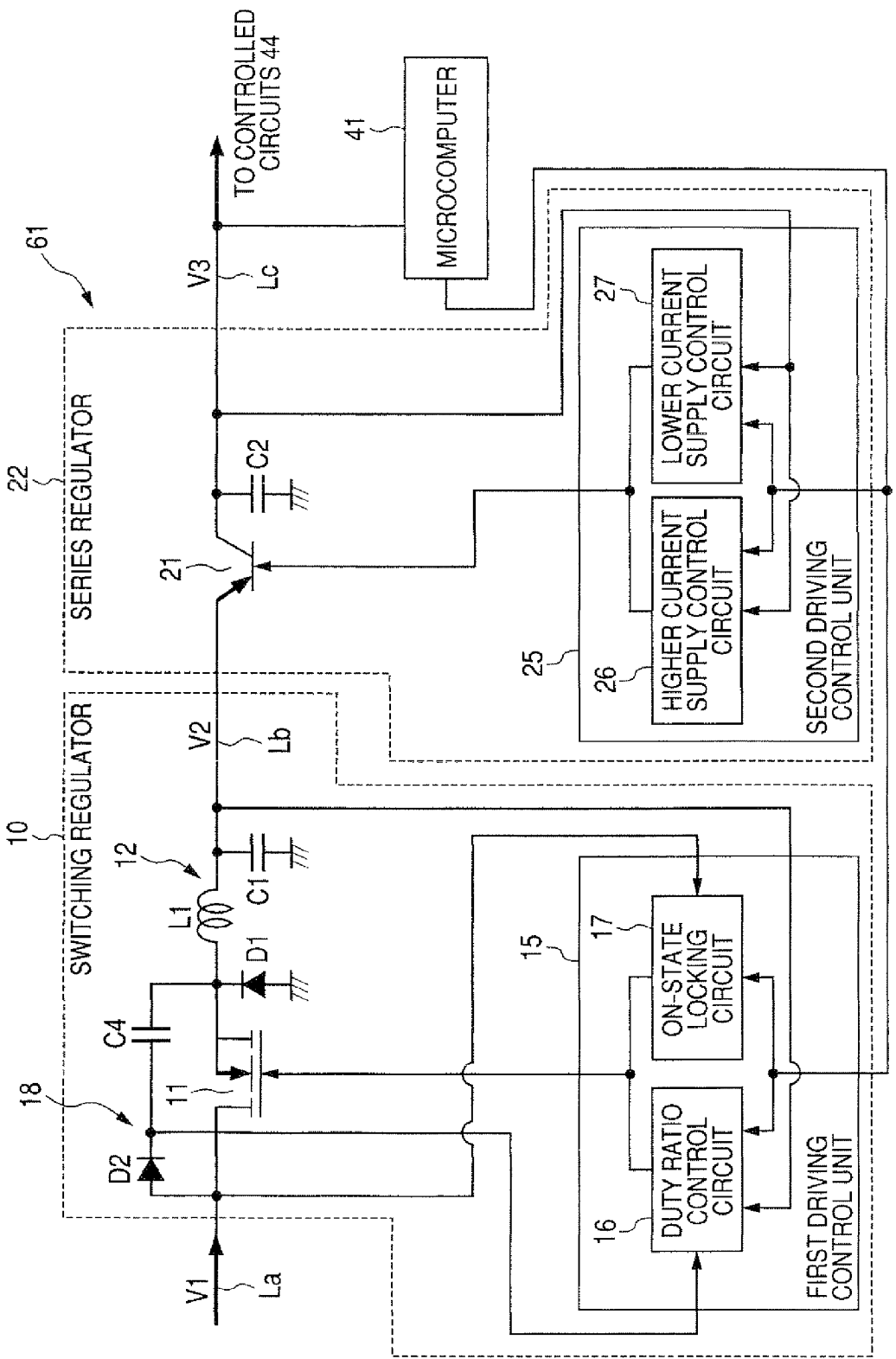

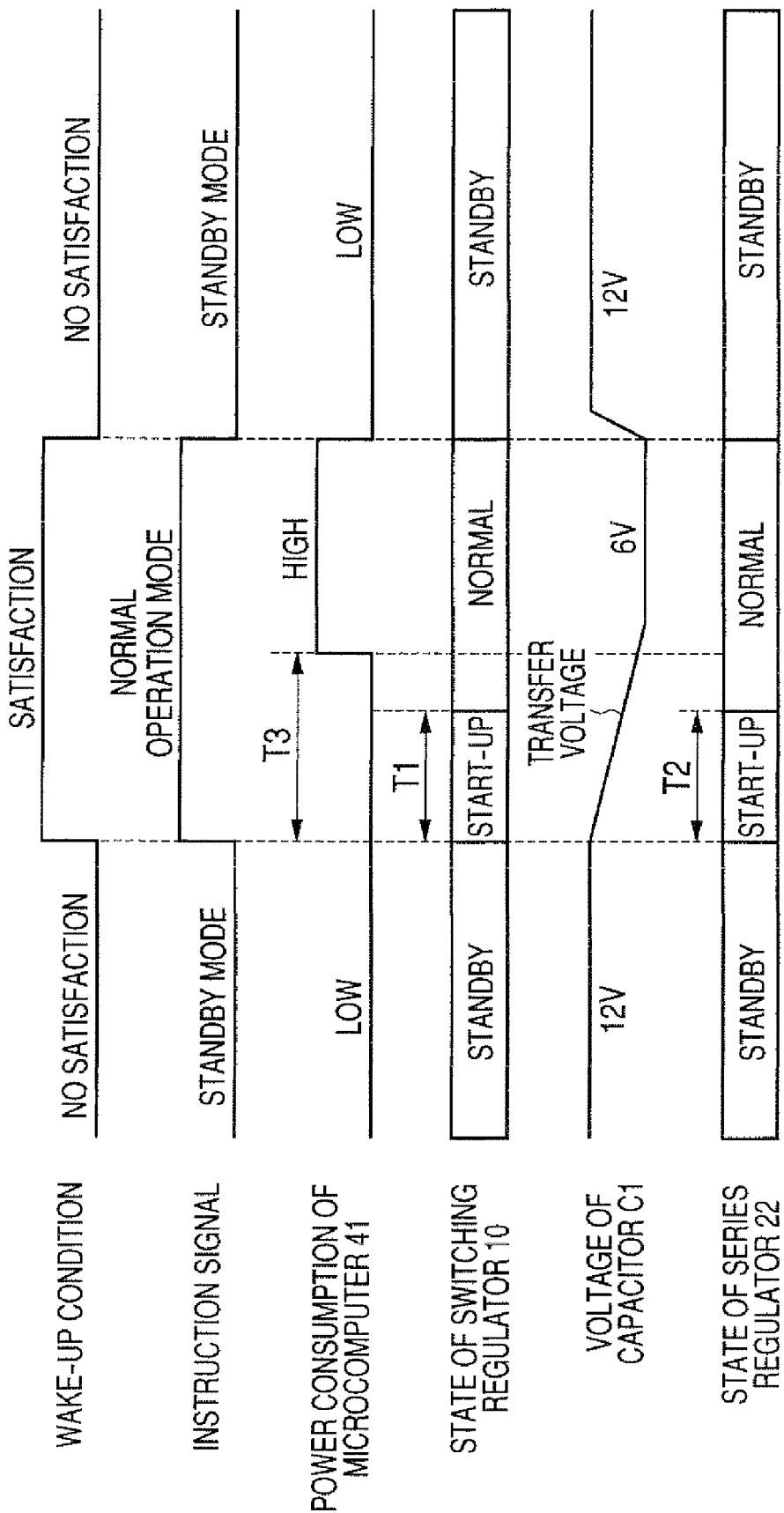

CONTROL SYSTEM PROVIDED WITH POWER SUPPLY UNIT OPERATING BASED ON OPERATION MODES INCLUDING STANDBY MODE

CROSS-REFERENCE TO RELATED APPLICATION

This application is based upon and claims the benefit of priority of the prior Japanese Patent Application 2008-12688 filed on Jan. 23, 2008, so that the contents of which are incorporated herein by reference.

BACKGROUND OF THE INVENTION

1. Field of the Invention

The present invention relates to a power supply unit which generates electric power set at a supply voltage. Further, the present invention relates to an electronic control system wherein a microcomputer and electronic circuits controlled by the microcomputer are operated while receiving and consuming the power of the power supply unit.

2. Description of Related Art

An electronic control system with a power supply unit is disposed in a vehicle. The power supply unit receives electric power set at a battery voltage from anon-vehicle battery acting as an external power source and generates electric power set at a supply voltage lower than the battery voltage. In the electronic control system, the unit supplies the electric power of the supply voltage to a microcomputer and electronic circuits including circuits controlled by the microcomputer. As types of the power supply unit, a switching regulator (or a switching power supply unit) and a series regulator (or a series power supply unit) are well known. For example, the switching regulator and the series regulator are disclosed in Published Japanese Patent First Publication No. H02-252007, and the switching regulator is disclosed in Published Japanese Patent First Publication No. 2004-173481.

The switching regulator has transistors connected in series on a current carrying line, a control unit and a smoothing circuit. When electric power of an external power source is supplied to the transistors through the line, the control unit performs an on-off control (or a switching control) for the transistors to supply a required quantity of electric power to the smoothing circuit, and the smoothing circuit outputs electric power set at a constant voltage. Therefore, although the supply voltage of the smoothing circuit cannot be precisely controlled, electric power consumed or lost in the switching regulator is low.

The series regulator has transistors connected in series on a current carrying line and a control unit. The control unit controls the transistors to increase and decrease current outputted through each transistor, so that a voltage difference between terminals of each transistor is precisely controlled. In this case, electric power is consumed in the transistors and is converted into heat. Therefore, although electric power consumed or lost in the switching regulator is large, the supply voltage of the series regulator can be precisely controlled.

To obtain the low loss of electric power in the switching regulator and the precise control in the series regulator, a two-stage power supply unit having both a switching regulator placed in the first stage and a series regulator placed in the second stage has been proposed. In this power supply unit, a switching regulator and a series regulator are disposed in series on a current carrying line connected with an external power source, the switching regulator reduces an input voltage of electric power received from the external voltage to an intermediate voltage slightly higher than a target voltage at a low loss of the electric power, and the series regulator reduces the intermediate voltage of the electric power to the target voltage with high precision.

In this two-stage power control unit, because of a low voltage drop in the series regulator, the loss of the electric power is low in the series regulator. Therefore, electric power set at the target voltage with high precision can be obtained at a low power loss. Especially, the performance of the electronic control system has been heightened year by year, so that electric power required by electronic circuits including a microcomputer has been increased in the system. Therefore, the two-stage power control unit is available for the electronic control system to reduce the loss of the electric power supplied to the electronic circuits while setting the target voltage with high precision.

In a type of electronic control system, a microcomputer performs a standby operation and a wake-up operation. More specifically, when the microcomputer judges that a standby condition is satisfied in the microcomputer, the microcomputer is transferred from a normal operation mode to a standby mode. In this standby mode, the microcomputer merely waits for the satisfaction of a wake-up condition. Therefore, electric power consumed in the microcomputer is low during the standby mode. Then, when the microcomputer detects the satisfaction of a wake-up condition, the microcomputer wakes up and returns to the normal operation mode to be fully operated. Therefore, electric power consumed in the microcomputer becomes large during the normal operation mode.

Especially, in an electronic control system disposed in a vehicle, even when the engine is stopped (more specifically, a power source of a vehicle ignition system is set in an off state) so as not to charge electric power to a non-vehicle battery, some electronic circuits are sometimes or intermittently operated. To reduce electric power consumed in a microcomputer for controlling the electronic circuits, only when the operation of the electronic circuits is required, the microcomputer is woken up and controls the electronic circuits.

Further, in the switching regulator, when transistors acting as switching elements are frequently turned on and off in the switching operation under control of a driving control unit, electric power consumed in the driving control unit for the switching operation is comparatively large. When electronic circuits consuming electric power of a power supply unit during the normal operation mode are set in the standby mode, none of the electronic circuits require the electric power. To reduce dark current consumed in the whole electronic control system when the electronic circuits are set in the standby mode, it is effective that the switching control for the transistors is stopped to stop the operation of the switching regulator.

A conventional electronic control system with a two-stage power control unit is described with reference to FIG. 1 and FIG. 2. In this system, when a microcomputer for controlling a switching regulator is set in a standby mode, the operation of the switching regulator is stopped.

FIG. 1 is a circuit view of an electronic control system with a two-stage power control unit in the prior art, while FIG. 2 is an explanatory view of the operation of the system shown in FIG. 1.

As shown in FIG. 1, an electronic control system has a two-stage power control unit 110 and a microcomputer 120. The unit 110 reduces an input voltage V1 (e.g., approximately 12V) applied by an on-board battery (not shown) to a supply voltage V3 (e.g., 5V) and supplies the electric power of the supply voltage V3 to the microcomputer 120 and peripheral circuits controlled by the microcomputer 120.

The unit 110 has a voltage drop type switching regulator 100 and a first series regulator 130 disposed in series. The unit 110 further has a second series regulator 140 disposed parallel to the regulators 100 and 130. The switching regulator 100 reduces the input voltage V1 to an intermediate voltage V2 equal to 6V lower than the voltage V1 and higher than the supply voltage V3. The series regulator 130 reduces the voltage V2 to the supply voltage V3.

The switching regulator 100 has an n-channel type MOSFET (metal oxide semiconductor field effect transistor) 101 of which the drain is connected with a power receiving line La through which electric current of the input voltage V1 is supplied to the FET 101, a smoothing circuit 102 connected with the source of the FET 101, and a driving control circuit 104 connected with the gate of the FET 101. The FET 101 performs a switching operation under control of the circuit 104. The smoothing circuit 102 smoothes the voltage of electric current outputted from the FET 101. The circuit 104 controls the FET 101 under control of the microcomputer 120 to adjust the smoothed voltage of the circuit 102 to the intermediate voltage V2.

The smoothing circuit 102 has a coil L102 of which terminals are, respectively, connected with the source of the PET 101 and a connection line Lb, a capacitor C102 of which terminals are, respectively, connected with the connection line Lb and a ground line, and a flywheel diode D102 of which terminals are, respectively, connected with the source of the FET 101 and another ground line. The coil L102 and the capacitor C102 act as a low pass filter to smooth the voltage of the current outputted from the PET 101. The flywheel diode D102 protects the FET 101 from the back electromotive energy generated in the coil L102 when the FET 101 is turned off. That is, when the FET 101 is turned off, a circulating current flow through the diode D102 to discharge electric power which is accumulated in the coil L102 during the on-state of the FET 101. Therefore, the regulator 100 outputs the smoothed voltage equal to the intermediate voltage V2 to the connection line Lb.

The first series regulator 130 has an output transistor (or a p-n-p bipolar transistor) 131 having the emitter connected with the connection line Lb and the collector connected with a power supply line Lc, a driving control circuit 132 connected with the base of the transistor 131, and a capacitor C133 of which terminals are, respectively, connected with the supply line Lc and a ground line. The circuit 132 linearly drives the transistor 131 in response to an instruction of the microcomputer 120 and controls the transistor 131 to adjust the supply voltage V3 of the transistor 131 to a target value of 5V. The capacitor C133 stabilizes the supply voltage V3 applied to the supply line Lc. Therefore, the regulator 130 reduces the intermediate voltage V2 of the regulator 100 to the supply voltage V3 and supplies electric power of the supply voltage V3 to electronic circuits including the microcomputer 120 and peripheral circuits controlled by the microcomputer 120 through the supply line Lc.

The second series regulator 140 has an output transistor (in this embodiment, a p-n-p bipolar transistor) 141 having the emitter connected with the line La and the collector connected with the supply line Lc, a driving control circuit 142 connected with the base of the transistor 141, and a capacitor C143 of which terminals are, respectively, connected with the supply line Lc and a ground line. The circuit 142 linearly drives the transistor 141 and controls the transistor 141 to adjust the supply voltage V3 of the transistor 141 to the target value of 5V. The capacitor C143 stabilizes the supply voltage V3 applied to the supply line Lc. Therefore, the regulator 140 reduces the input voltage V1 of the line La to the supply voltage V3 and supplies electric power of the supply voltage V3 to the electronic circuits.

The second series regulator 140 is always operated to produce electric current of the supply voltage V3 from electric current of the voltage V1. In contrast, the regulators 100 and 130 are operated only when the microcomputer 120 instructs the regulators 100 and 130. The electric current outputted from the regulator 140 is set to be lower than that outputted from the regulator 130. More specifically, the base current outputted from the circuit 142 to the transistor 141 is set to be lower than that outputted from the circuit 132 to the transistor 131. Therefore, even when no current is outputted from the regulators 100 and 130 to the electronic circuits, the regulator 140 supplies electric current to the electronic circuits.

As shown in FIG. 2, when the microcomputer 120 judges that a standby condition of the control system is satisfied, the mode of the microcomputer 120 is transferred from the normal operation mode to the standby mode, and the microcomputer 120 changes the level of an instruction signal from the high level to the low level. During the standby mode of the microcomputer 120, the microcomputer 120 operates only a wake-up condition detecting circuit (not shown) among various circuits of the microcomputer 120 to detect the satisfaction of a wake-up condition, so that the electric power consumed in the microcomputer 120 is reduced.

In response to the instruction signal set to the low level, the regulators 100 and 130 are set in the stop state together More specifically, the circuit 104 stops the switching control for the FET 101 and locks the FET 101 to the off state, and the circuit 132 stops the linearly-driving control for the transistor 131 and locks the transistor 131 to the off state. That is, the microcomputer 120 stops operations of the regulators 100 and 130. During the standby state of the regulator 100, electric charge accumulated in the capacitor C102 is discharged, so that the capacitor C102 has no charge.

During the standby mode of the microcomputer 120, the electronic circuits including the microcomputer 120 receive the minimum quantity of electric power required in the electronic circuits only from the regulator 140. Therefore, electric power consumed in the electronic circuits is reduced during the standby mode.

Thereafter, when the microcomputer 120 receives a specific signal indicating a wake-up condition, the wake-up condition detecting circuit of the microcomputer 120 detects that a wake-up condition is satisfied. In response to this detection, the microcomputer 120 changes the instruction signal to the high level without changing its own mode and outputs this instruction signal to the circuits 104 and 132 of the regulators 100 and 130. In response to the instruction signal being changed to the high level, the regulator 100 is set to the start-up state, while the regulator 100 is still set in the stop state. More specifically, the circuit 104 immediately restarts the switching control for the FET 101. In this case, because of no electric charge accumulated in the capacitor C102 during the standby mode, after the restart of the switching control for the FET 101, the voltage of the connection line Lb depending on the electric charge of the capacitor C102 is too low for a period of time Ta to adjust the connection line Lb to the intermediate voltage V2. In other words, after the instruction signal being changed to the high level is received, it takes the period of time Ta until the voltage of the connection line Lb is increased to the intermediate voltage equal to 6V. Then, the regulator 100 is set to the normal operation state in response to an elapse of the period of time Ta.

To reliably operate the regulator 130, the circuit 132 of the regulator 130 waits for the period of time Ta after a reception of the instruction signal changed to the high level, and then the circuit 132 is set to the start-up state. That is, the circuit 132 starts driving the transistor 131 in response to an elapse of the period of time Ta. When a certain period of time Tb (Tb>Ta) has elapsed after the reception of the instruction signal changed to the high level, the regulator 130 is set to the normal operation state to reliably output the supply voltage V3 of the target value to the electronic circuits including the microcomputer 120. Because the microcomputer 120 can fully become operated while consuming electric power of the supply voltage V3, the microcomputer 120 changes its own mode to the normal operation mode in response to an elapse of the period of time Tb starting from the output of the instruction signal changed to the high level.

After the transistor 131 receives the intermediate voltage V2 equal to the intermediate value of 6V, the regulator 130 requires a period of time Tb−Ta equal to the difference between the period of time Tb and the period of time Ta to sufficiently supply the electric current of the supply voltage V3 to the electronic circuits. That is, after the transistor 131 receiving the intermediate voltage V2 starts performing the driving operation, it takes the period of time Tb−Ta until the regulator 130 stably outputs the supply voltage V3.

Assuming that the circuit 132 immediately performs the linearly-driving control for the transistor 131 just after the reception of the instruction signal changed to the high level, the regulator 130 cannot output electric current of the supply voltage V3 to the supply line Lc just after the reception of the instruction signal or an elapse of the period of time Ta. Assuming that the microcomputer 120 changes its own mode to the normal operation mode before an elapse of the period of time Tb, a large quantity of electric current required by the electronic circuits immediately flows from the regulator 130 to the electronic circuits including the microcomputer 120 set to the normal operation mode. In this case, the voltage of electric current outputted from the regulator 140 is lowered, so that the microcomputer 120 cannot reliably perform its normal operation.

Therefore, the mode of the microcomputer 120 is transferred to the normal operation mode when the period of time Tb has elapsed after the change of the instruction signal to the high level.

As described above, in the conventional electronic control system, during the standby mode of the microcomputer 120, the regulator 100 locks the FET 101 to the off state, and none of the capacitors C102 and C133 accumulate electric charge. When the microcomputer 120 is woken up, it is impossible for the regulators 100 and 130 to supply electric current of the supply voltage V3 to the electronic circuits including the microcomputer 120 in a short time. Therefore, it is undesirably required that the transfer from the standby mode to the normal operation mode in the microcomputer 120 is largely delayed. That is, it is difficult for the electronic circuits including the microcomputer 120 set in the standby mode to wake up and perform their normal operations in a short time.

SUMMARY OF THE INVENTION

An object of the present invention is to provide, with due consideration to the drawbacks of the conventional electronic control system, a power supply unit which produces electric current of a supply voltage from an input voltage higher than the supply voltage in a short time after the satisfaction of a wake-up condition in a control unit to supply the electric current of the supply voltage to the control unit. Further, the object of the present invention is to provide an electronic control system with the power supply unit.

According to an aspect of this invention, the object is achieved by the provision of an electronic control system, comprising a power supply unit and a control unit. The power supply unit receives an input voltage from an external power source through an input line and produces a supply voltage lower than the input voltage from the input voltage. The control unit is transferred from a standby mode to a normal operation mode in response to satisfaction of a wake-up condition, receives a first quantity of electric current set at the supply voltage from the power supply unit through a supply line in the normal operation mode to consume the first quantity of electric current, and receives a second quantity of electric current of the supply voltage from the power supply unit through the supply line in the standby mode to consume the second quantity of electric current. The second quantity is smaller than the first quantity. The power supply unit comprises a voltage drop type switching regulator having a capacitor and a series regulator. The switching regulator applies the input voltage of the input line to a connection line in response to the standby mode of the control unit while accumulating electric charge in the capacitor, starts performing a switching operation in response to the satisfaction of the wake-up condition in the control unit to produce a transfer voltage on the connection line from the input voltage of the input line and to adjust the transfer voltage to an intermediate voltage, and performs the switching operation in response to the normal operation mode of the control unit to produce the intermediate voltage on the connection line from the input voltage of the input line. The series regulator produces the supply voltage on the supply line from either the input voltage of the input line or the input voltage of the connection line in case of the standby mode of the control unit, starts a voltage regulating operation for the transfer voltage of the connection line in response to the satisfaction of the wake-up condition while using the electric charge of the capacitor of the switching regulator, and produces the supply voltage on the supply line from the intermediate voltage of the connection line produced by the switching regulator in response to the normal operation mode of the control unit.

The object is also achieved by the provision of a power supply unit which receives an input voltage from an external power source through an input line, produces a supply voltage lower than the input voltage from the input voltage, supplies a first quantity of electric current set at the supply voltage to a control unit set in a normal operation mode through a supply line, and supplies a second quantity of electric current set at the supply voltage to the control unit set in a standby mode through the supply line. The standby mode of the control unit is transferred to the normal operation mode in response to cancellation of the standby mode. The second quantity is smaller than the first quantity. The power supply unit comprises a voltage drop type switching regulator having a capacitor and a series regulator. The switching regulator applies the input voltage of the input line to a connection line in response to the standby mode of the control unit while accumulating electric charge in the capacitor, starts performing a switching operation in response to the cancellation of the standby mode in the control unit to produce a transfer voltage on the connection line from the input voltage of the input line and to adjust the transfer voltage to an intermediate voltage, and performs the switching operation in response to the normal operation mode of the control unit to produce the intermediate voltage on the connection line from the input voltage of the input line. The series regulator produces the supply voltage on the supply line from either the input voltage of the input line or the input voltage of the connection line applied by the switching regulator in case of the standby mode of the control unit, starts a voltage regulating operation for the transfer voltage of the connection line in response to the cancellation of the standby mode in the control unit while using the electric charge of the capacitor of the voltage drop type switching regulator, and produces the supply voltage on the supply line from the intermediate voltage of the connection line produced by the switching regulator in response to the normal operation mode of the control unit.

With this structure of the electronic control system and the power supply unit, when the control unit is set in the standby mode, the switching element of the switching regulator is locked to an on state. Therefore, because no switching operation is performed in the switching regulator, electric power consumed in the switching regulator is reduced. Accordingly, electric power consumed in the whole system can be reduced.

When the wake-up condition is satisfied in the control unit or the standby mode is cancelled in the control unit, the switching operation of the switching element is started, and a voltage regulating operation is started in the series regulator. In this case, because electric charge accumulated in the capacitor of the switching element during the standby mode of the control unit is immediately supplied to the series regulator, the voltage regulating operation of the series regulator is immediately started while using the charge in response to the satisfaction of the wake-up condition or the cancellation of the standby mode or is started while using the charge within a short period of time starting from the satisfaction of the wake-up condition or the cancellation of the standby mode.

Accordingly, the electronic control system and the power supply unit can supply electric current at the supply voltage to the control unit through the supply line in a short time, and a period of time required for the control unit to be transferred from the standby mode to the normal operation mode in response to the satisfaction of the wake-up condition or the cancellation of the standby mode can be shortened.

BRIEF DESCRIPTION OF THE DRAWINGS

FIG. 8 is a circuit view of a power supply unit disposed in the system shown in FIG. 3 according to the second embodiment; and FIG. 9 is an explanatory view of the operation of the unit shown in FIG. 8.

DETAILED DESCRIPTION OF THE PREFERRED EMBODIMENTS

Figure 1:
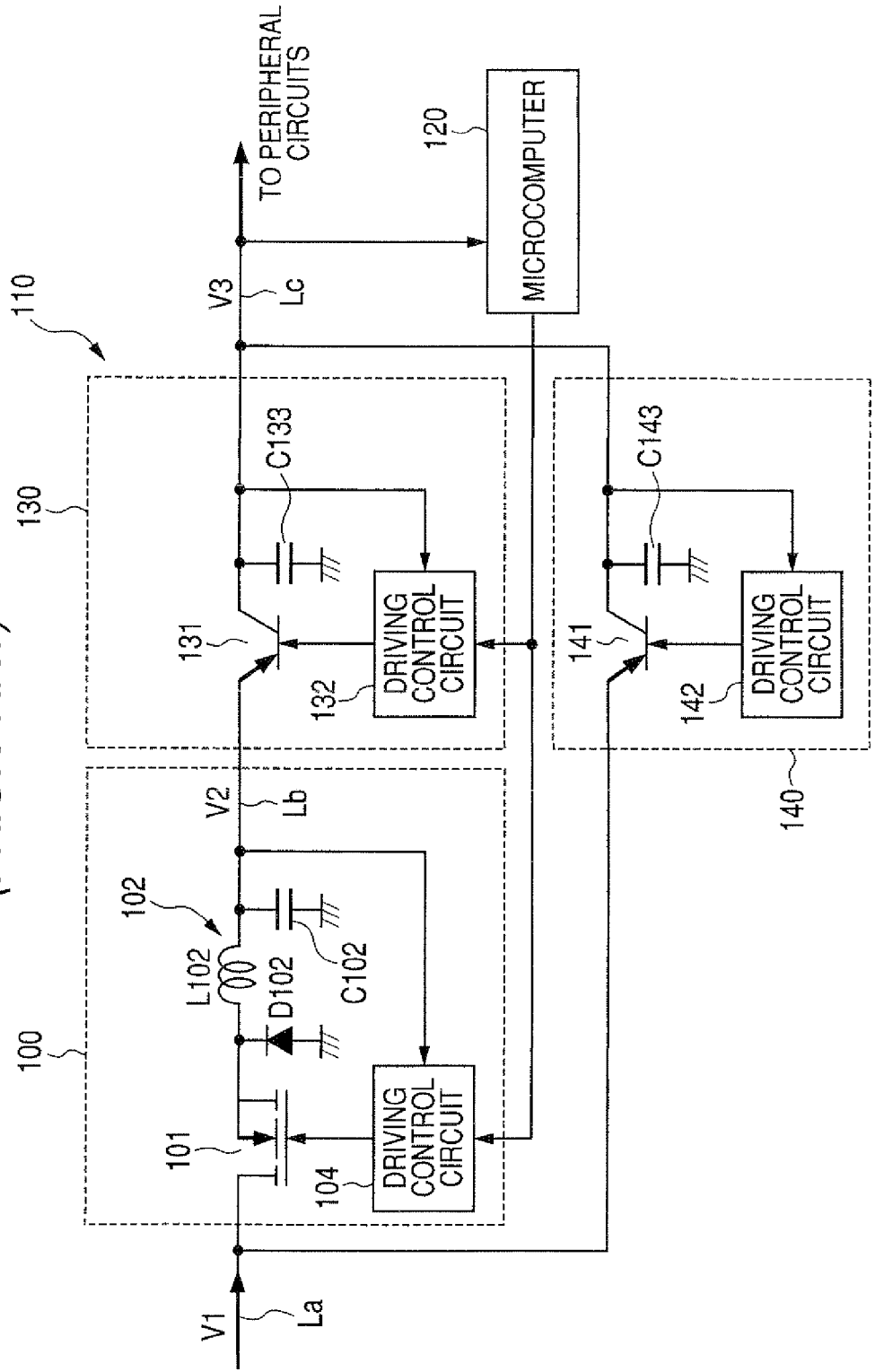
FIG. 1 is a circuit view of an electronic control system with a two-stage power supply unit in the prior art.

Embodiments of the present invention will now be described with reference to the accompanying drawings, in which like reference numerals indicate like parts, members or elements throughout the specification unless otherwise indicated.

First Embodiment

Figure 3:
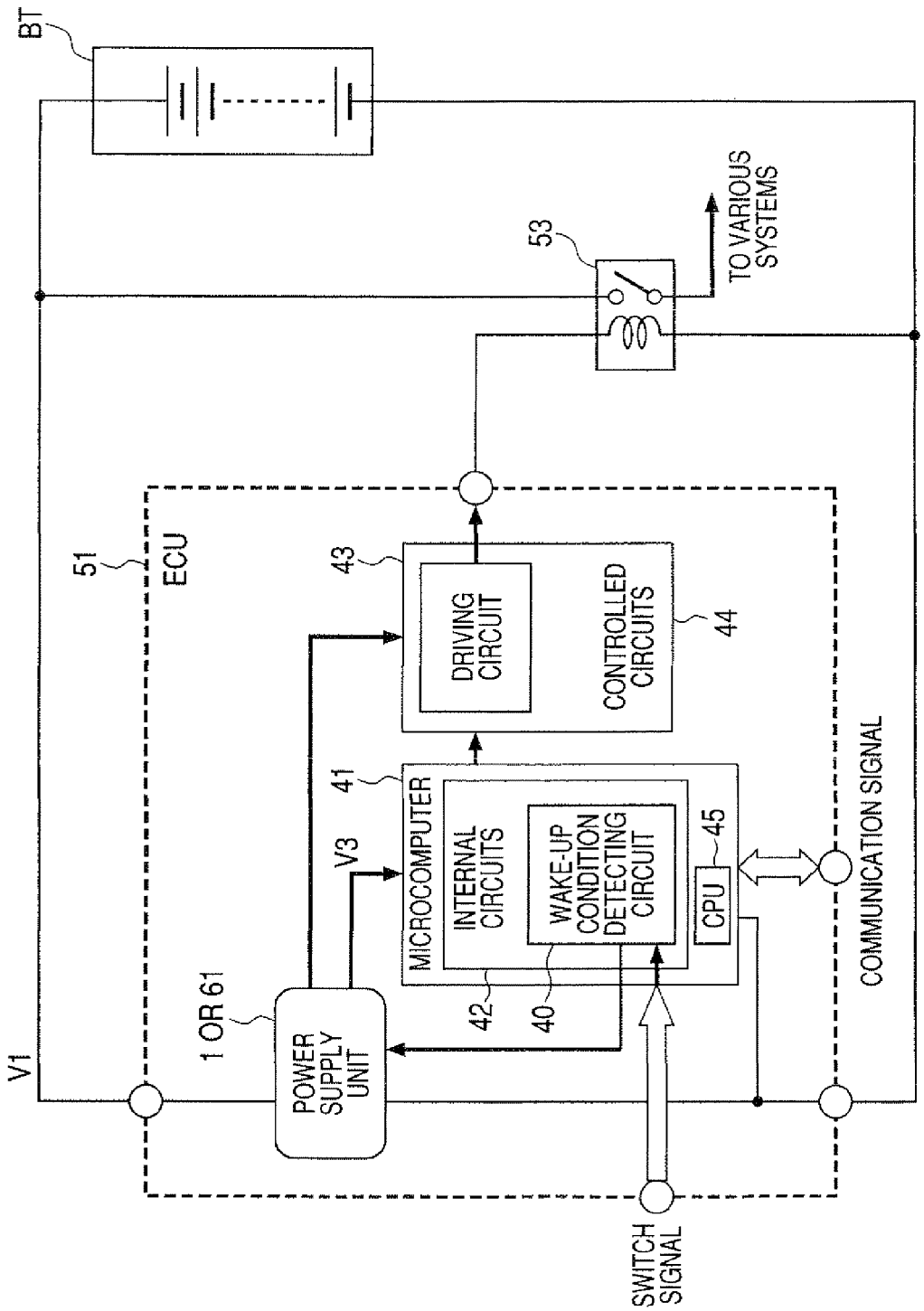
FIG. 3 is a view showing the structure of an electronic control system according to the first embodiment of the present invention.

FIG. 3 is a view showing the structure of an electronic control system according to first and second embodiments.

An electronic control unit (ECU) 51 shown in FIG. 3 is disposed in a vehicle and represents an electronic control system. As shown in FIG. 3, the ECU 51 has a microcomputer (or a controller) 41 for controlling the operation of the ECU 51, a plurality of controlled circuits 44 including driving circuits 43, and a two-stage power supply unit 1 or 61 for receiving electric current of an input voltage V1 (e.g., approximately 12V) from an on-board battery BT representing an external power source through a power receiving line La, producing a supply voltage V3 equal to a constant target value (e.g., 5V) from the input voltage V1 under control of the microcomputer 41, and supplying electric current of the supply voltage VS to the microcomputer 41 and the controlled circuits 44 through a power supply line Lc. Each of the microcomputer 41 and the controlled circuits 44 is operated while consuming the electric current of the supply voltage V3. For example, each driving circuit 43 drives a current consumer according to a control signal of the microcomputer 41.

The microcomputer 41 is transferred from a standby mode to a normal operation mode in response to satisfaction of a wake-up condition or cancellation of the standby mode, receives a first quantity of electric current set at the supply voltage V3 from the power supply unit 1 through the line Lc in the normal operation mode to consume the first quantity of electric current, and receives a second quantity of electric current of the supply voltage V3 from the power supply unit 1 through the line Lc in the standby mode to consume the second quantity of electric current. The microcomputer 41 outputs an instruction signal to the unit 1 or 61. This signal indicates the standby mode, satisfaction of a wake-up condition (i.e., cancellation of the standby mode), or the normal operation mode. The unit 1 or 61 is operated in response to the instruction signal.

During the normal operation mode of the microcomputer 41, the microcomputer 41 operates various internal circuits 42 and a central processing unit (CPU) 45. In contrast, during the standby mode of the microcomputer 41, the microcomputer 41 operates only a wake-up condition detecting circuit 40 among the circuits 42 to detect the satisfaction of a wake-up condition. Therefore, the second quantity of electric current consumed in the microcomputer 41 of the standby mode is smaller than the first quantity of electric current consumed in the microcomputer 41 of the normal operation mode.

Figure 5:
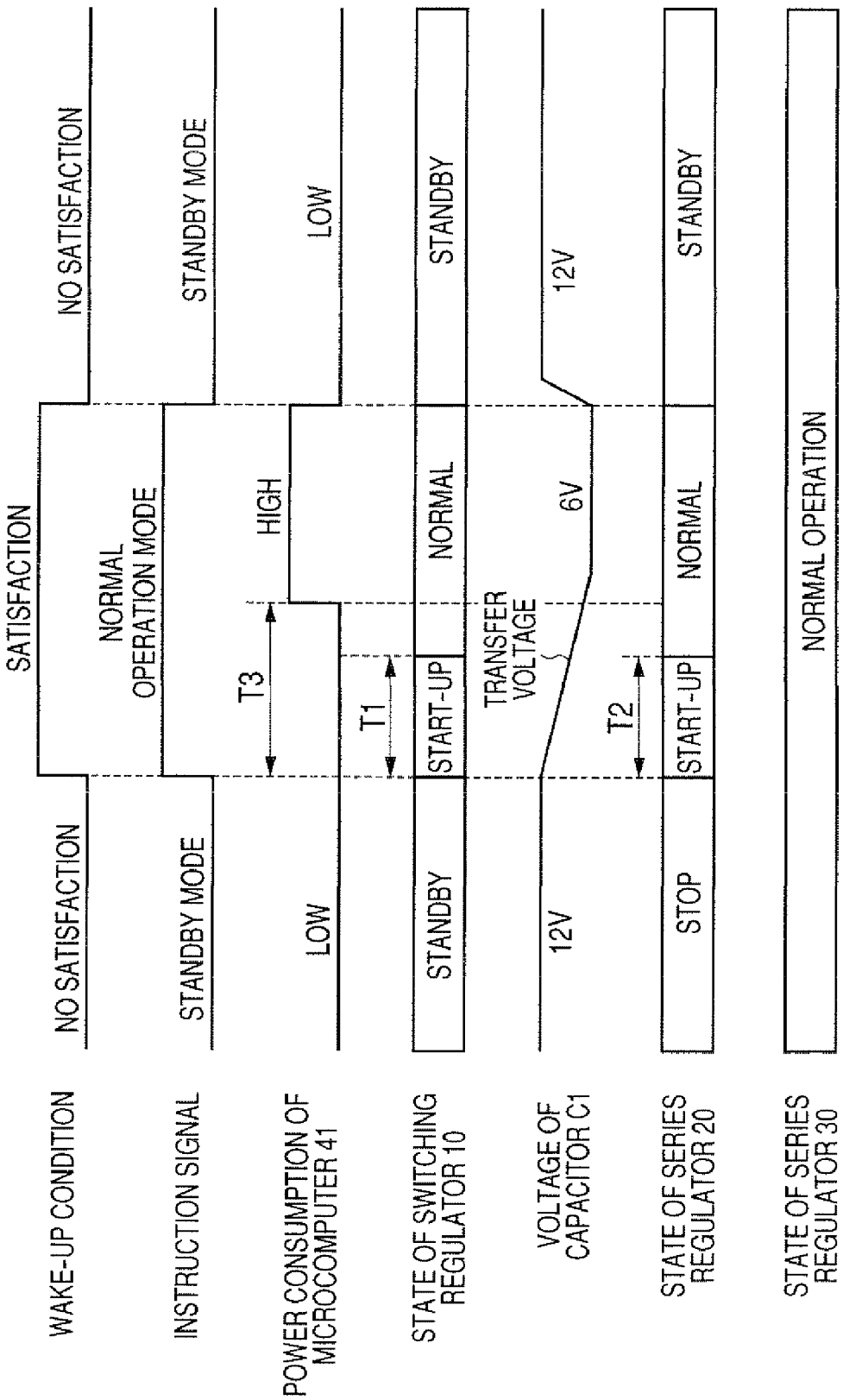
FIG. 5 is an explanatory view of the operation of the unit shown in FIG. 4.

As shown in FIG. 5, when the microcomputer 41 set in the normal operation mode judges that a standby condition of the ECU 51 is satisfied, the microcomputer 41 is transferred from the normal operation mode to a standby mode, and the microcomputer 41 sets the instruction signal to the low level indicating the standby mode.

Thereafter, when the microcomputer 41 receives a signal indicating a wakeup condition, the circuit 40 of the microcomputer 41 detects the satisfaction of a wake-up condition. In response to this detection, the microcomputer 41 immediately changes the instruction signal to the high level indicating the normal operation mode, and the microcomputer 41 is transferred to the normal operation mode after an elapse of a transfer period of time T3.

During the normal operation mode of the microcomputer 41, the microcomputer 41 controls an ignition (IG) relay 53 through the driving circuit 43. The battery BT acting as an ignition power source supplies electric power to other on-board devices such as other ECUs and driving circuits controlled by the other ECUs through the IG relay 53. When the microcomputer 41 detects, from a switch signal, that the ignition has been switched off by a driver, the IG relay 53 is turned off to disconnect the battery ET from the other on-board devices, and no electric power is supplied to the other on-board devices.

The standby condition of the ECU 51 includes the turning-off of the IG relay 53. Therefore, when the engine of the vehicle is stopped, the standby condition is satisfied. In contrast, when the driver turns on a start switch to start operating the engine, the microcomputer 41 receives a specific switch signal indicating the turning-on of the switch signal as a wake-up condition. Further, the microcomputer 41 receives a communication signal as a wake-up condition from one of the other ECUs through a communication line. Therefore, the wake-up condition is satisfied by the specific switch signal or the communication signal received in the microcomputer 41.

Figure 4:
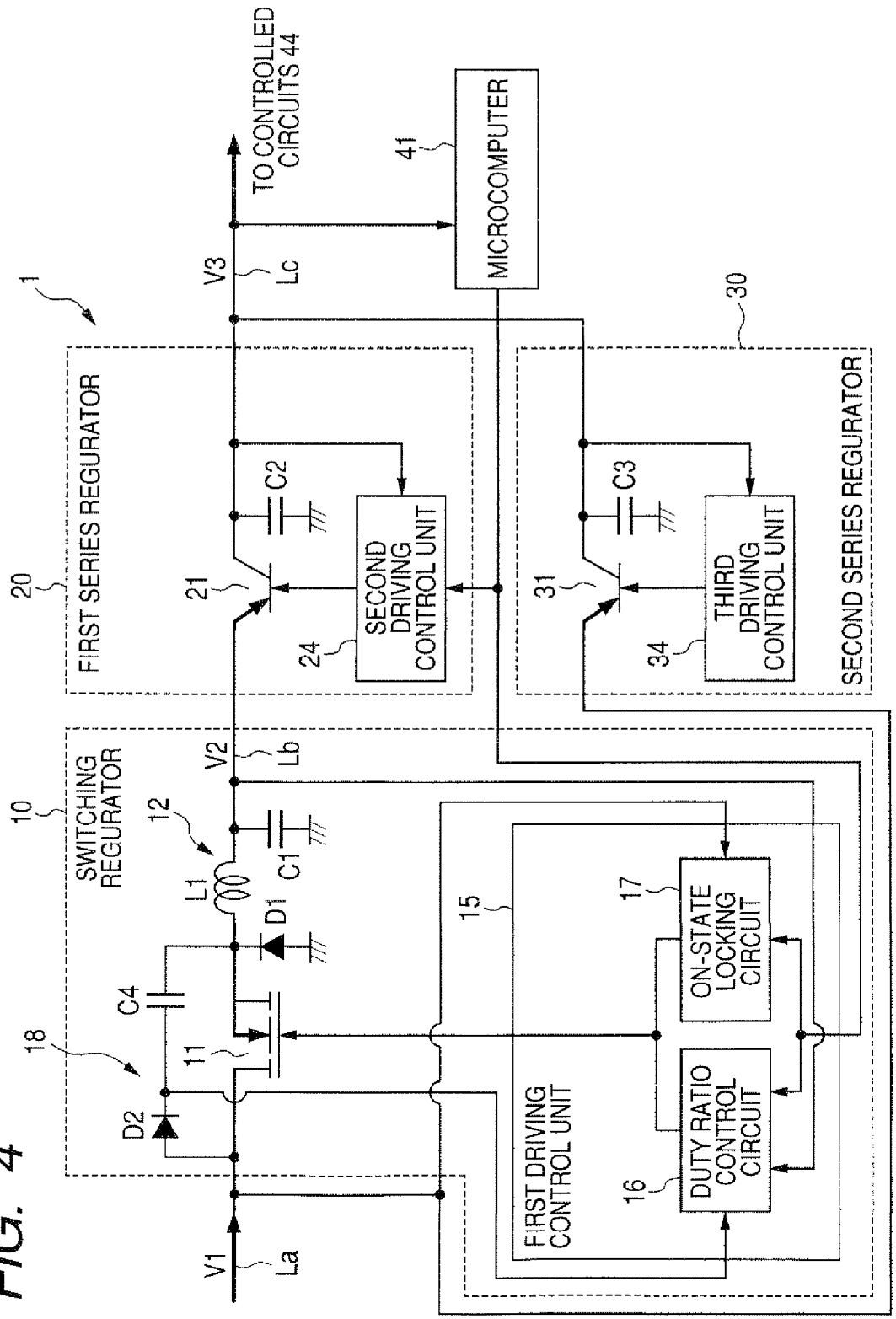
FIG. 4 is a circuit view of a two-stage power supply unit disposed in the system shown in FIG. 3 according to the first embodiment of the present invention.

FIG. 4 is a circuit view of a power supply unit disposed in the system shown in FIG. 3 according to the first embodiment.

As shown in FIG. 4, the power supply unit 1 has a voltage drop type switching regulator 10 with a capacitor C1, a first series regulator 20 and a second series regulator 30. The regulators 10 and 20 are disposed in series, while the regulator 30 is disposed parallel to the regulators 10 and 20.

The switching regulator 10 applies the input voltage V1 of the line La to a connection line Lb in response to the low level of the instruction signal (i.e., the standby mode of the microcomputer 41) while accumulating electric charge from the input voltage V1 in the capacitor C1. The regulator 10 starts performing a switching operation in response to the instruction signal changing to the high level (i.e., satisfaction of the wake-up condition in the microcomputer 41). This produces a transfer voltage on the connection line, starting from the input voltage V1, from the input voltage V1 of the line La and adjusts the transfer voltage to an intermediate voltage V2 (e.g. 6V) lower than the voltage V1 and higher than the voltage V3. Then, the regulator 10 performs the switching operation in response to the high level of the instruction signal (i.e., the normal operation mode of the microcomputer 41). This produces the intermediate voltage V2 of the connection line Lb from the input voltage La of the input line La.

The first series regulator 20 produces the supply voltage V3 on the line Lc from the input voltage V1 of the line Lb applied by the switching regulator 10 in response to the low level of the instruction signal The regulator 20 starts a voltage regulating operation for the transfer voltage of the line Lb in response to the instruction signal just changed to the high level while using the electric charge of the capacitor C1 of the switching regulator 10, and produces the supply voltage V3 on the line Lc from the intermediate voltage V2 of the line Lb produced by the switching regulator 10 in response to the high level of the instruction signal.

The second series regulator 30 always produces the supply voltage V3 of the line Lc from the input voltage V1 of the line La, regardless of the mode of the microcomputer 41, to supply the second quantity of electric current set at the voltage V3 to the microcomputer 41.

The regulator 10 has an n-channel type MOS-FET (representing a switching element) 11 for repeatedly performing a switching operation (or an on-off operation) for electric current of the input voltage V1 transmitted though the line La to produce a pulsating current of a changing voltage, a smoothing circuit 12 for smoothing the changing voltage of the pulsating current outputted from the FET 11 to a smoothed voltage of a direct current, and a first driving control unit (or a switching element control unit) 15 for locking the FET 11 to the on state, at the timing that the instruction signal is changed to the low level, until the instruction signal is returned to the high voltage or the instruction signal of the low level is cancelled by the microcomputer 41, and controlling the switching operation of the FET 11 in response to the instruction signal of the high level sent from the microcomputer 41 to adjust the smoothed voltage of the circuit 12 to the intermediate voltage V2. The drain terminal of the FET 11 is connected with the line La. The unit 15 adjusts the gate voltage in response to the instruction signal and applies the gate voltage to the gate of the FET 11 to control the duty ratio of the current outputted from the FET 11.

The circuit 12 has a coil L1 having a terminal connected with the source terminal of the FET 11 and another terminal connected with the line Lb, the capacitor C1 having a first terminal connected with the connection line Lb and a second terminal connected with a ground line, and a flywheel diode D1 having an anode connected with another ground line and a cathode connected with the source of the FET 11. The second terminal of the capacitor C1 is set at a ground voltage lower than the intermediate voltage V2. The combination of the coil L1 and the capacitor C1 acts as a low pass filter to smooth the voltage of the current outputted from the FET 11. In the same manner as the diode D102 shown in FIG. 1, the diode D1 protects the FET 11 from the back electromotive energy generated in the coil L1 when the FET 11 is turned off.

The regulator 10 further has a bootstrap circuit 18 for generating a boot voltage higher than the input voltage V1 when the FET 11 is turned on. This circuit 18 has a diode D2 and a capacitor C4 serially connected with each other between the drain and source of the FET 11. The anode of the diode D2 is connected with the drain of the FET 11, the cathode of the diode D2 is connected with the first terminal of the capacitor C4, and the second terminal of the capacitor C4 is connected with the source of the FET 11. When the FET 11 is set in the off state, the source of the FET 11 and the second terminal of the capacitor C4 are approximately set at the earthed voltage (i.e., electric potential of the ground line), and positive electric charge passing through the diode D2 are accumulated at the first terminal of the capacitor C4 at the input voltage V1. Thereafter, when the FET 11 is turned on, the source of the FET 11 is increased to a source voltage approximately equal to or slightly lower than the input voltage V1, while the charge of the capacitor C4 is still held between the diode D2 and the capacitor C4. Therefore, the electric potential difference between the terminals of the capacitor C4 is maintained, and the boot voltage at the connection point between the diode D2 and the capacitor C4 becomes equal to the sum of the source voltage of the FET 11 and the charged voltage of the capacitor C4. The unit 15 receives this boot voltage.

The driving control unit 15 has a duty ratio control circuit 16 with a push-pull circuit and an on-state locking circuit 17 with a charge pump circuit. The circuit 16 is operated in response to the instruction signal of the microcomputer 41 set in the high level, while the circuit 17 is operated in response to the instruction signal set in the low level. The push-pull circuit in the circuit 16 uses the boot voltage of the circuit 18 for a gate voltage and applies this gate voltage to the gate of the FET 11 to perform a switching (or on-off) control for the FET 11 while controlling a duty ratio of the current outputted from the FET 11. Therefore, the circuit 16 adjusts the smoothed voltage of the smoothing circuit 12 to the intermediate voltage V2. The on-state locking circuit 17 locks or fixes the FET 11 to the on-state. More specifically, the charge pump circuit in the circuit 17 produces, from the input voltage V1 of the line La, a gate voltage slightly higher than the sum of the source voltage of the FET 11 set at the on-state and an on-threshold voltage of the FET 11 and applies this gate voltage to the gate of the FET 11 to lock the FET 11 to the on-state.

The on-threshold voltage is described. When the source of an FET set in the off-state is set at the earthed voltage (0V) in the same manner as in the FET 101 shown in FIG. 1, an on-threshold voltage of the FET is defined such that the FET is turned on in response to the on-threshold voltage applied to the gate of the FET. However, in this embodiment, when the on-state of the FET 11 is continued while a gate voltage is applied to the gate of the FET 11, the FET 11 has the source voltage approximately equal to the input voltage V1 higher than the earthed voltage. Therefore, assuming that the on-threshold voltage of the FET 11 is applied to the gate of the FET 11 set in the on-state, the on-state of the FET 11 is not continued, but the FET 11 is turned off. To lock the FET 11 to the on-state, it is required that the gate voltage applied to the gate of the FET 11 is equal to or slightly higher than the sum of the source voltage of the FET 11 and the on-threshold voltage of the FET 11. Therefore, the circuit 17 produces the gate voltage to lock the FET 11 to the on-state.

The electric power consumed in the circuit 17 is considerably lower than that consumed in the circuit 16. The reason is as follows. When the circuit 16 controls the FET 11 to repeatedly perform the switching operation, a comparatively large current repeatedly flows through a parasitic capacitor between the gate and source of the FET 11. Therefore, large current is consumed in the FET 11 during the operation of the circuit 16. In contrast, when the circuit 17 locks the FET 11 to the on-state, an electric current flows through the parasitic capacitor only once. Therefore, current consumed in the FET 11 during the operation of the circuit 17 is low. Further, current consumed in the charge pump circuit is considerably lower than that consumed in the push-pull circuit. Therefore, as compared with the current consumed in the regulator 10 when the circuit 16 controls the FET 11 to repeatedly perform the switching operation (i.e., the regulator 10 is operated), the current consumed in the regulator 10 is greatly reduced when the circuit 17 locks the FET 11 to the on-state. That is, the consumed current in the circuit 17 is lower than that in the circuit 16.

The first series regulator 20 has an output transistor 21 (in this embodiment, a p-n-p bipolar transistor) for performing a driving operation (or a voltage regulating operation) for the electric current of the intermediate voltage V2 transmitted through the connection line Lb to output a pulsating current of a changing voltage to the line Lc, a capacitor C2 for stabilizing the pulsating current of the transistor 21 to produce a direct current of a stabilized voltage, and a second driving control unit (or an output transistor control unit) 24 for setting the transistor 21 in the off-state in response to the instruction signal set in the low level, until the instruction signal is returned to the high level or the instruction signal of the low level is cancelled by the microcomputer 41, to prohibit an electric current from being transmitted from the connection line Lb to the supply line Lc, immediately starting a driving control (or a voltage regulating control) for the transistor 21 at the timing that the instruction signal is changed to the high level, and continuously controlling the driving operation of the transistor 21 in response to the instruction signal set in the high level to adjust the stabilized voltage of the capacitor C2 to the supply voltage V3.

The emitter of the transistor 21 is connected with the connection line Lb, and the collector of the transistor 21 is connected with the supply line Lc. Terminals of the capacitor C2 are, respectively, connected with the supply line Lc and a ground line. The unit 24 applies a base voltage adjusted in response to the instruction signal to the base of the transistor 21 to linearly drive the transistor 21 and to control the duty ratio of the current outputted from the transistor 21. Therefore, the regulator 20 reduces the intermediate voltage V2 of the regulator 10 to the supply voltage V3 and supplies electric power of the supply voltage V3 to the microcomputer 41 and the controlled circuits 44 through the supply line Lc.

Especially, the unit 24 immediately turns on the transistor 21 in response to the instruction signal set to the high level. Therefore, the control operation of the unit 24 for the transistor 21 differs from the control operation of the circuit 132 for the transistor 131 (see FIG. 1) in that the unit 24 has no waiting time such as the time Ta (see FIG. 2) after the reception of the instruction signal set to the high level.

The second series regulator 30 has an output transistor (in this embodiment, a p-n-p bipolar transistor) 31 for repeatedly performing a driving operation for the second quantity of electric current of the input voltage V1 transmitted through the line La to output a pulsating current of a changing voltage to the supply line Lc, a capacitor C3 for stabilizing the pulsating current to produce a direct current of a stabilized voltage, and a third driving control unit 34 for always controlling the driving operation of the transistor 31 to adjust the stabilized voltage of the capacitor C3 to the supply voltage V3.

The emitter of the transistor 31 is connected with the line La, and the collector of the transistor 31 is connected with the supply line Lc. Terminals of the capacitor C3 are, respectively, connected with the supply line Lc and a ground line. The unit 34 applies a base voltage to the base of the transistor 31 to linearly drive the transistor 31 and to control the duty ratio of the current outputted from the transistor 31. Therefore, regardless of the instruction signal of the microcomputer 41, the regulator 30 reduces the input voltage V1 of the line La to the supply voltage V3 to always supply the second quantity of electric power of the supply voltage V3 to the controlled circuits 44 and the microcomputer 41.

With this structure of the ECU 51, when the microcomputer 41 is set to the standby mode, the controlled circuits 44 are set to the standby mode.

The operation of the ECU 51 is now described below with reference to FIG. 5. FIG. 5 is an explanatory view of the operation of the ECU 51 shown in FIG. 4.

As shown in FIG. 5, when the normal operation mode of the microcomputer 41 is continued, the regulators 10 and 20 are set in the normal operation state. More specifically, in the regulator 10, the duty ratio control circuit 16 of the unit 15 controls the FET 11 to alternately perform the switching operation while charging the capacitor C4 at a first charged voltage approximately equal to the input voltage V1. In the regulator 20, the driving control unit 24 controls the transistor 21 to alternately perform the driving operation. Therefore, the input voltage V1 is dropped to the intermediate voltage V2 in the regulator 10, and the intermediate voltage V2 is dropped to the supply voltage V3 in the regulator 20.

When the microcomputer 41 judges in response to a switch signal or a communication signal from another device or another ECU that a standby condition of the ECU 51 is satisfied, the microcomputer 41 is transferred from the normal operation mode to the standby mode, and the microcomputer 41 sets an instruction signal to the low level. During the standby mode of the microcomputer 41, the microcomputer 41 operates only the wake-up condition detecting circuit 40 to detect the satisfaction of a wake-up condition, so that the electric current consumed in the microcomputer 41 is reduced.

In response to the instruction signal set to the low level, the regulator 10 is set to a standby state. In this standby state, the circuit 16 stops controlling the FET 11, and the on-state locking circuit 17 of the unit 15 locks the FET 11 to the on-state while consuming a low electric power. Further, in response to the instruction signal of the low level, the regulator 20 is set to a stop state. In this stop state, the unit 24 of the regulator 20 stops a linear driving control for the transistor 21 and locks the transistor 21 to the off-state.

Because of the off-state of the transistor 21, the transistor 21 prevents an electric current from flowing to the controlled circuits 44 and the microcomputer 41 through the FET 11, but the capacitor C1 is charged through the FET 11 and the coil L1. Therefore, the connection line Lb and the terminal of the capacitor C1 connected with the connection line Lb are increased to a second charged voltage approximately equal to the input voltage V1. Further, the source of the FET 11 is increased to a source voltage approximately equal to the input voltage V1, so that the connection point between the diode D2 and the capacitor C4 is set at a boot voltage equal to the sum of the source voltage of the FET 11 and the charged voltage of the capacitor C4.

In contrast, the second series regulator 30 is always set in a normal operation state. More specifically, the regulator 30 is always operated and supplies the second quantity of electric current to the controlled circuits 44 and the microcomputer 41 at the supply voltage V3. Therefore, the circuit 40 of the microcomputer 41 is operated in response to the supply of the electric current from the regulator 30.

Thereafter, when the microcomputer 41 receives a switch signal or a communication signal indicating a wake-up condition, the circuit 40 of the microcomputer 41 detects that a wake-up condition of the ECU 51 is satisfied. In response to this detection, the microcomputer 41 immediately changes the instruction signal to the high level without changing its own mode for a transfer period of time T3. In response to this instruction signal, the regulators 10 and 20 are immediately set in the start-up state. More specifically, in the regulator 10, the circuit 17 of the unit 15 immediately stops locking the FET 11 to the on-state, and the circuit 16 of the unit 15 immediately starts performing the switching control for the FET 1. Therefore, a transfer voltage of the connection line starting from the second charged voltage approximately equal to the input voltage V1 is lowered toward the smoothed voltage while the electric charge accumulated in the capacitor C1 is discharged to the regulator 20, and the circuit 16 controls the switching operation of the FET 11 so as to adjust the transfer voltage of the connection line to the intermediate voltage.

When a first period of time T1 has elapsed after a start on the switching control for the FET 11 (i.e., the reception of the instruction signal set in the high level), the regulator 10 reliably outputs the electric current of the intermediate voltage V2 to the connection line Lb. That is, the regulator 10 is set in the transfer state during the first period of time T1, and then the regulator 10 is set to the normal operation state.

During the transfer state in the regulator 20, just after the start on the switching control for the FET 11, the charge outputted from the capacitor C1 of the regulator 10 is supplied to the emitter of the transistor 21. Therefore, when the driving control unit 24 immediately controls the transistor 21 in response to the instruction signal of the high level, the transistor 21 can immediately perform the driving operation while using the received charge. Therefore, when a second period of time T2 has elapsed after a start on the linear driving control for the transistor 21 (i.e., the reception of the instruction signal set in the high level), the regulator 20 reliably supplies the supply voltage V3 to the controlled circuits 44 and the microcomputer 41. That is, the regulator 20 is set in the transfer state during the second period of time T2, and then being set in a normal operation state.

When a transfer period of time T3 has elapsed after an output of the instruction signal set in the high level from the microcomputer 41 (i.e., the reception of the instruction signal set in the high level in the regulators 10 and 20), the microcomputer 41 is set to the normal operation mode. The transfer period of time T3 is set as follows. Because the unit 24 of the regulator 20 immediately starts performing the linear driving control for the transistor 21 after the reception of the instruction signal set in the high level, both the first period of time T1 and the second period of time T2 are simultaneously started. When a longer one of both the first period of time T1 and the second period of time T2 has elapsed, both the first period of time T1 and the second period of time T2 have elapsed, and the regulators 10 and 20 can stably output electric current of the supply voltage V3 to the microcomputer 41. Therefore, the transfer period of time T3 started simultaneously with the first period of time T1 and the second period of time T2 is set to be equal to or slightly longer than a longer one of both the first period of time T1 and the second period of time T2.

Figure 2:
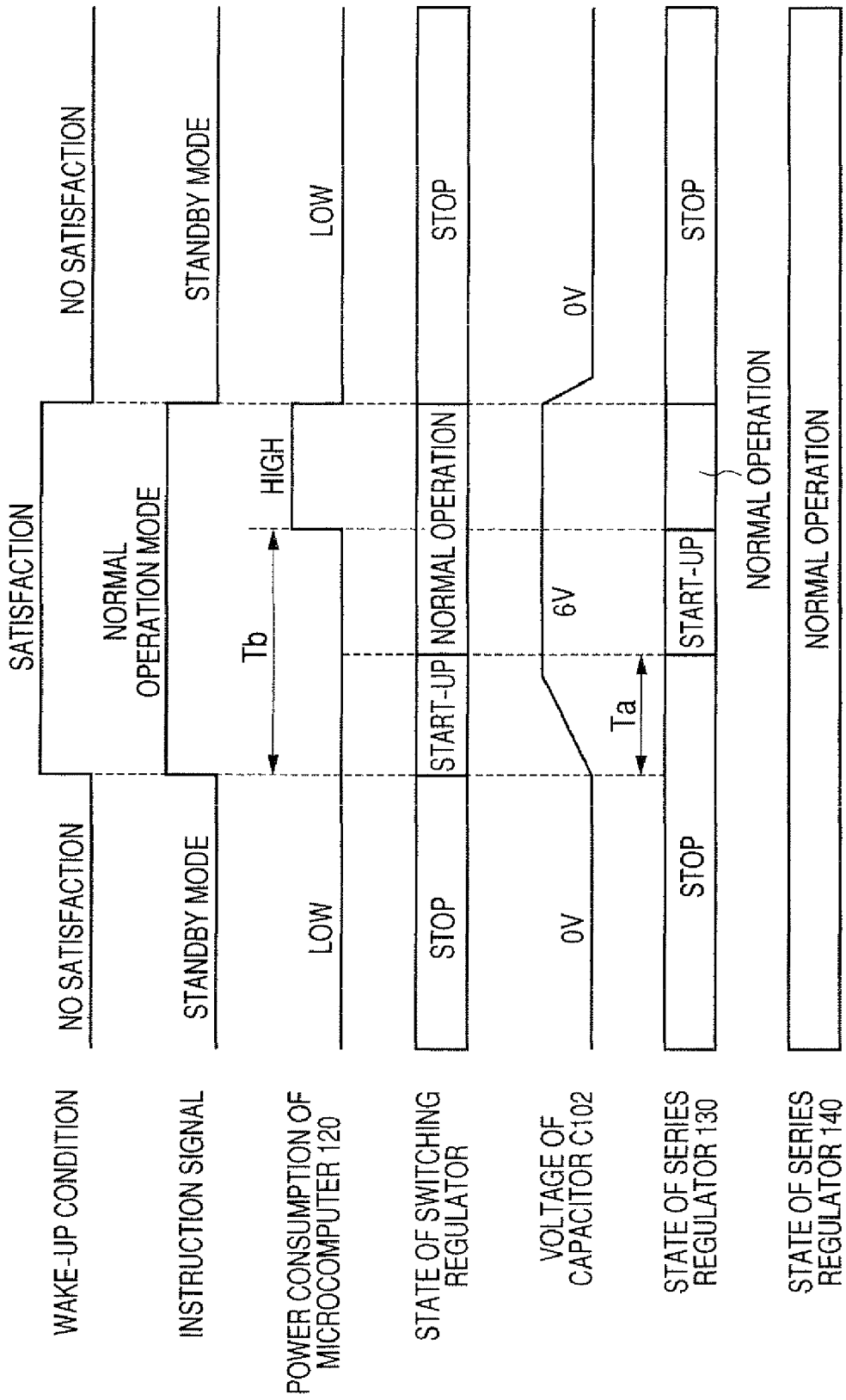
FIG. 2 is an explanatory view of the operation of the system shown in FIG. 1.

In the prior art, a wake-up period of time in the regulator 130 is started after a wake-up period of time in the regulator 100 (see FIG. 2). However, in this embodiment, the second period of time T2 overlaps with the first period of time T1. Therefore, the transfer period of time T3 is considerably shortened as compared with the period of time Tb required in the power supply unit 110 shown in FIG. 1.

Accordingly, in the power supply unit 1 and the ECU 51, when a wake-up condition of the ECU 51 is satisfied, the microcomputer 41 can be transferred from the standby mode to the normal operation mode in a short time, and the ECU 51 can be returned to the normal operation mode in a short time. For example, in a short time after the satisfaction of the wake-up condition, the ECU 51 can control the IG relay 53 such that the battery BT starts supplying electric power to an on-vehicle device such as another ECU or a controlled device through the IG relay 53. Further, when the ECU 51 receives a communication signal from a second ECU, the ECU 51 can start the communication with the second ECU in a short time.

Further, when the microcomputer 41 is set in the standby mode, the regulator 10 is set in the standby state, the regulators 20 is set in the stop state, and the regulator 30 supplies a second quantity of electric current set at the supply voltage V3 to the microcomputer 41. The microcomputer 41 set in the standby mode requires the second quantity of electric current as a minimum limit to detect a wake-up condition. Because electric power consumed in the regulator 30 is lower than that consumed in the regulators 10 and 20 set in the normal operation state, electric power (i.e., dark current) consumed in the whole ECU 51 set in the standby mode can be further reduced.

In this embodiment, the smoothing circuit 12 has the coil L1 and the diode D1 in addition to the capacitor C1 to sufficiently reduce ripples caused in the electric current of the intermediate voltage V2. However, the smoothing circuit 12 may have only the capacitor C1. In this case, when the capacitance of the capacitor C1 is set at a large value, the ripples can be reduced.

First Modification of First Embodiment

Figure 6:
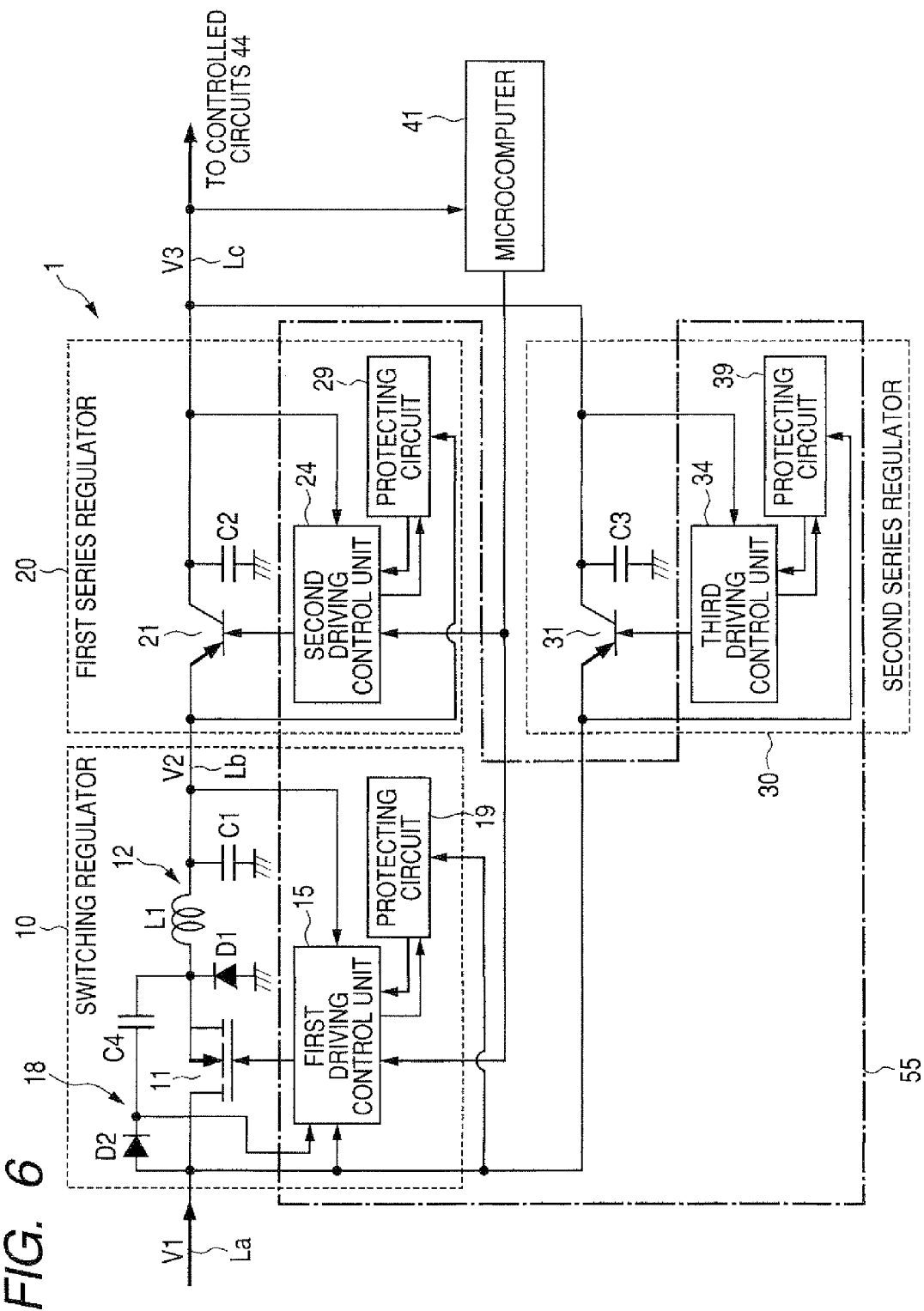
FIG. 6 is a circuit view of a power supply unit disposed in the system shown in FIG. 3 according to the first modification of the first embodiment.

FIG. 6 is a circuit view of a power supply unit disposed in the system shown in FIG. 3 according to the first modification of the first embodiment.

As shown in FIG. 6, the regulator 10 may have a protecting circuit 19 for measuring electric current flowing from the source to drain in the FET 11 and/or the input voltage V1 applied to the source of the PET 11, and controlling the unit 15, when the current and/or the voltage exceeds an upper limit so as to place the FET 11 in an over-current state and/or an over-voltage state, to lock the FET 11 to the off-state. Further, the regulator 20 may have a protecting circuit 29 for measuring electric current flowing between the emitter and collector of the transistor 21 and/or the voltage V2 applied to the emitter of the transistor 21, and controlling the unit 24, when the current and/or the voltage exceeds an upper limit so as to place the transistor 21 in an over-current state and/or an over-voltage state, to lock the transistor 21 to the off-state. Moreover, the regulator 30 may have a protecting circuit 39 for measuring electric current flowing between the emitter and collector of the transistor 31 and/or the voltage applied to the emitter of the transistor 31, and controlling the unit 34, when the current and/or the voltage exceeds an upper limit so as to place the transistor 31 in an over-current state and/or an over-voltage state, to lock the transistor 31 to the off-state.

Therefore, even when at least one of the PET 11 and the transistors 21 and 31 is operated in the over-current state and/or the over-voltage state, the protecting circuit 19, 29 or 39 immediately stops the operation of the FET 11, the transistor 21 or the transistor 31. Accordingly, the power supply unit 1 and the ECU 51 with the unit 1 can be operated at higher reliability.

Further, the units 15, 24 and 39 of the regulators 10, 20 and 30 may be formed as an integrated circuit 55. In this case, the power supply unit 1 can be manufactured in a small size at a low cost.

Moreover, the protecting circuits 19, 29 or 39 and is the units 15, 24 and 39 of the regulators 10, 20 and 30 may be formed as the integrated circuit 55. In this case, the power supply unit 1 can be further miniaturized, and the manufacturing cost of the power supply unit 1 can be further reduced.

Furthermore, at least one of controlled elements among the FET 11 and the transistors 21 and 31 may be placed in the integrated circuit 55. In this case, it is preferable that the protecting circuit 19, 29 or 39 control the unit 15, 24 or 34, when the temperature of the controlled element exceeds an upper limit to place the controlled element in an overheat state, to lock the controlled element to the off-state. Accordingly, the power supply unit 1 and the ECU 51 with the unit 1 can be further reliably operated.

Second Modification of First Embodiment

Figure 7:
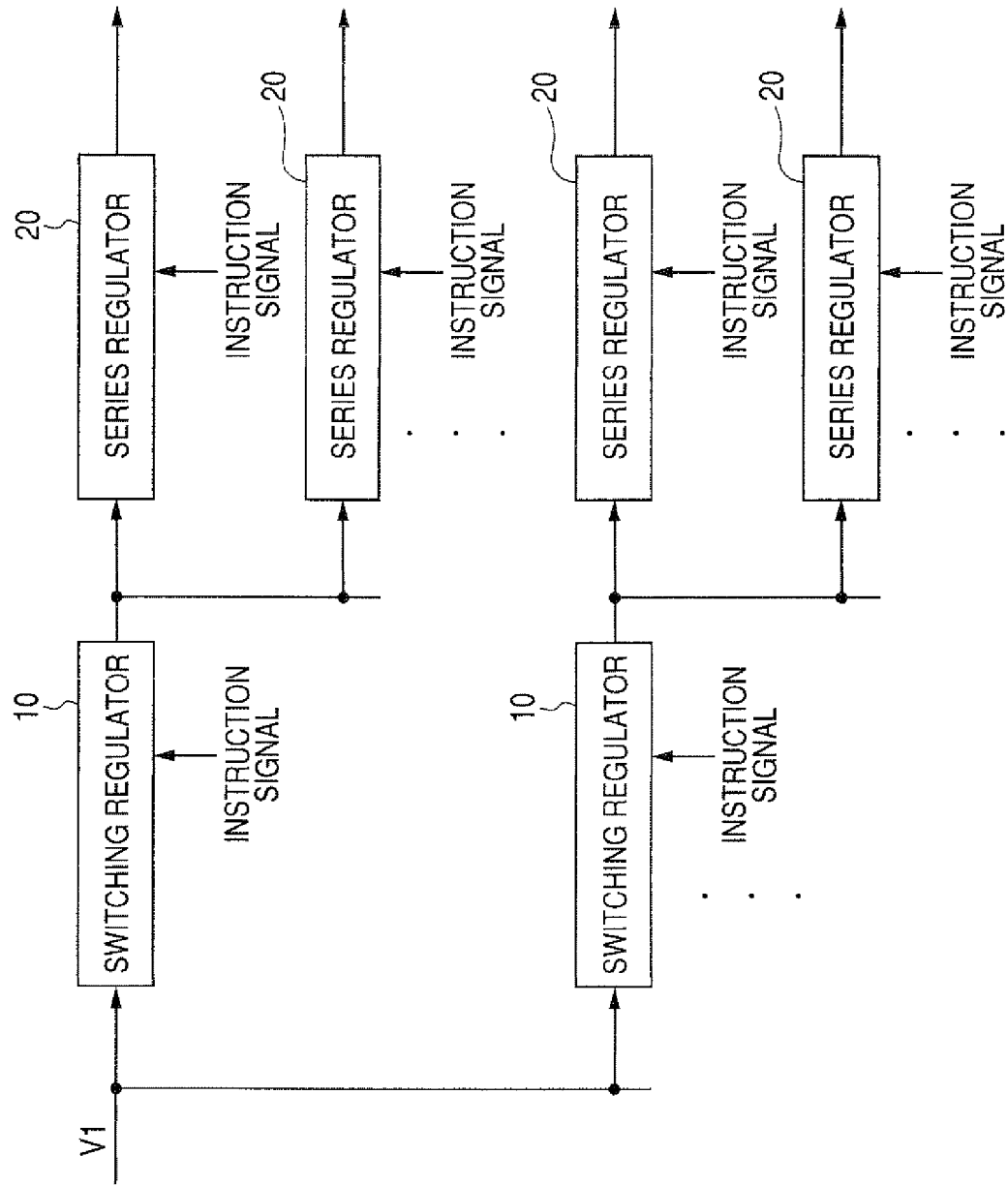
FIG. 7 is a circuit view of a power supply unit disposed in the system shown in FIG. 3 according to the second modification of the first embodiment.

FIG. 7 is a circuit view of a power supply unit disposed in the system shown in FIG. 3 according to the second modification of the first embodiment.

As shown in FIG. 7, the power supply unit 1 may have a plurality of first series regulators 20 disposed parallel to one another and disposed in series with the regulator 10. Each regulator 20 outputs the electric current of the supply voltage V3 to one controlled circuit 42 or the plurality of controlled circuits 44 which are not connected with the other regulators 20. The regulators 20 receive different instruction signals from the microcomputer 41. Only when the microcomputer 41 sends an instruction signal set in the low level to each of all regulators 20, the microcomputer 41 sends the instruction signal set in the low level to the regulator 10.

With this structure of the unit 1, the ECU 51 selects a single controlled circuit 42 or a group of controlled circuits 44 required to be operated in the normal operation mode, and the microcomputer 41 sends an instruction signal or a plurality of instruction signals to one regulator 20 or a plurality of regulators 20 corresponding to the single controlled circuit 42 or the group of controlled circuits 44.

Accordingly, the ECU 51 can supply electric power only to the single controlled circuit 42 or the selected group of controlled circuits 44.

Further, when the protecting circuit 29 detects a malfunction or a defect occurring in a specific controlled circuit 42, the ECU 51 can stop the supply of electric power to the specific controlled circuit 42 by sending the instruction signal set in the low level to one regulator 20 corresponding to the specific controlled circuit 42.

As shown in FIG. 7, the power supply unit 1 may have a plurality of switching regulators 10 disposed parallel to one another, while each switching regulator 10 and at least one first series regulator 20 are disposed in series.

Second Embodiment

FIG. 8 is a circuit view of a power supply unit disposed in the system shown in FIG. 3 according to the second embodiment, while FIG. 9 is an explanatory view of the operation of the unit shown in FIG. 8.

As shown in FIG. 8, the power supply unit 61 has the switching regulator 10 and a series regulator 22 disposed in series. When the regulator 22 is set in a higher current output mode in response to the high level of the instruction signal, the regulator 22 produces the supply voltage V3 from the intermediate voltage V2 of the regulator 10, after an elapse of a transfer period of time T3 starting at the timing that the instruction signal is changed to the high level, to supply a larger quantity of electric current set at the voltage V3 to the microcomputer 41 and the controlled circuits 44 through the line Lc. When the regulator 22 is set in a lower current output mode in response to the low level of the instruction signal, the regulator 22 produces the supply voltage V3 from the input voltage V1 of the line Lb applied by the regulator 10 to supply a smaller quantity of electric current set at the voltage V3 to the microcomputer 41 and the controlled circuits 44 through the line Lc.

The series regulator 22 has the transistor 21, the capacitor C2 and a second driving control unit 25. The unit 25 has a higher current supply control circuit 26 operated in response to the high level of the instruction signal and a lower current supply control circuit 27 operated in response to the low level of the instruction signal. The circuit 26 supplies a current of a first base voltage to the base of the transistor 21 in response to the instruction signal of the high level to perform a first linear driving control for the transistor 21. The transistor 21 starts the driving operation while receiving electric current of the transfer voltage set in the line Lb during the second period of time T2. Therefore, the series regulator 22 outputs the larger quantity of electric current set at the supply voltage V3 to the line Lc after the second period of time T2. The circuit 27 supplies a current of a second base voltage to the base of the transistor 21 in response to the instruction signal of the low level to perform a second linear driving control for the transistor 21. The transistor 21 receives electric current of the input voltage V1 set in the line Lb, and the series regulator 22 outputs the smaller quantity of electric current set at the supply voltage V3 to the line Lc.

With this structure of the unit 61, as shown in FIG. 9, each time an instruction signal received in the unit 25 of the regulator 22 is changed to the high level by the microcomputer 41, the regulator 22 is set to a transfer state for the first period of time T1, and then outputs electric current of the voltage V3. In contrast, each time the instruction signal is changed to the low level, the regulator 22 is set to a standby state and immediately outputs electric current of the voltage V3.

When the regulator 22 is set in the higher current output mode, the regulator 22 is operated under control of the circuit 26 in the same manner as the regulator 20 shown in FIG. 4. Especially, just after the regulator 22 is set to the transfer state in response to the instruction signal changed to the high level, the transistor 21 starts performing the driving operation while using the charge received from the capacitor C1 of the regulator 10. When the first period of time T1 has elapsed, the regulator 22 reliably outputs the larger quantity of electric current set at the supply voltage V3 to the microcomputer 41 and the controlled circuits 24.

In contrast, when the regulator 22 is set in the lower current output mode, the regulator 22 is operated under control of the circuit 27 in the same manner as the regulator 30 shown in FIG. 4. Especially, because the FET 11 is locked to the on-state in response to the instruction signal set in the low level, an electric current of the second charged voltage approximately equal to the input voltage V1 is supplied to the emitter of the transistor 21 through the FET 11 and the coil L1. Therefore, the regulator 22 substantially reduces the input voltage V1 to the supply voltage V3 and reliably outputs the smaller quantity of electric current set at the supply voltage V3 to the microcomputer 41 and the controlled circuits 24.

Accordingly, in the same manner as in the first embodiment, the capacitor C1 is substantially charged at the input voltage V1 during the standby mode of the microcomputer 41. When the standby mode of the microcomputer 41 is cancelled and is transferred to the normal operation mode, the connection line Lb is set at a transfer voltage changing from the input voltage V1, while the regulator 10 discharges the charge of the capacitor C1 to the regulator 22. Therefore, the transfer voltage can be immediately adjusted to the intermediate voltage V2, and the regulator 22 can reliably supply the larger quantity of electric current set at the supply voltage V3 to the microcomputer 41 and the controlled circuits 44 after an elapse of the second period of time T2. Accordingly, the transfer period of time T3 in the microcomputer 41 can be shortened.

Further, any series regulator such as the regulator 30 (see FIG. 4) always operated is not disposed in the unit 61. Accordingly, the ECU 51 and the unit 61 can be manufactured at a low cost in a small size.

In the same manner as the first modification (see FIG. 6) of the first embodiment, the regulator 22 may have the protecting circuit 29, or the circuit 25 and the protecting circuit 29 may be disposed in an integrated circuit. Further, in the same manner as the second modification (see FIG. 7) of the first embodiment, the unit 61 may have a plurality of series regulators 22 serially disposed with the regulator 10, or the unit 61 may have a plurality of switching regulators 10 while having at least one regulator 22 serially disposed with each regulator 10.

These embodiments should not be construed as limiting the present invention to structures of those embodiments. For example, the power supply unit 1 (see FIG. 4) according to the first embodiment may have only the regulators 10 and 20 without having the regulator 30, while the regulator 20 is operated even when the instruction signal of the microcomputer 41 is set in the low level. In this case, because no switching operation of the FET 11 is performed, electric power consumed in the unit 1 can be reduced. Further, during the standby mode of the microcomputer 41, because the regulator 20 reduces the input voltage V1 applied to the connection line Lb to the supply voltage V3, the voltage difference between the collector and emitter of the transistor 21 is enlarged. However, because electric current flowing through the transistor 21 is reduced so as to lower a quantity of electric current supplied to the microcomputer 41 and the controlled circuits 44, it is not required to enlarge the size of the transistor 21.

Further, each of the input voltage V1 and the supply voltage V3 may be set at any value such that the voltage V1 is higher than the supply voltage V3, and the intermediate voltage V2 may be set at any value between the input voltage V1 and the supply voltage V3.

Moreover, in the embodiments, the MOS-FET 11 is disposed as a switching element of the transistor 10. However, any transistor such as a bipolar transistor may be used as the switching element.

Furthermore, the start timing of the driving control of the driving control unit 24 or 25 for the transistor 21 may be slightly delayed as compared with the start timing of the switching control of the driving control unit 15 for the FET 11.

What is claimed is:

1. An electronic control system, comprising:
a power supply unit which receives an input voltage from an external power source through an input line and produces a supply voltage lower than the input voltage from the input voltage; and
a control unit which is transferred from a standby mode to a normal operation mode in response to satisfaction of a wake-up condition, receives a first quantity of electric current set at the supply voltage from the power supply unit through a supply line in the normal operation mode to consume the first quantity of electric current, and receives a second quantity of electric current of the supply voltage from the power supply unit through the supply line in the standby mode to consume the second quantity of electric current, the second quantity being smaller than the first quantity,
wherein the power supply unit comprises:
a voltage drop type switching regulator, having a capacitor, which applies the input voltage of the input line to a connection line in response to the standby mode of the control unit while accumulating electric charge in the capacitor, starts performing a switching operation in response to the satisfaction of the wake-up condition in the control unit to produce a transfer voltage on the connection line from the input voltage of the input line and to adjust the transfer voltage to an intermediate voltage, and performs the switching operation in response to the normal operation mode of the control unit to produce the intermediate voltage on the connection line from the input voltage of the input line; and
a series regulator which produces the supply voltage on the supply line from either the input voltage of the input line or the input voltage of the connection line applied by the switching regulator in case of the standby mode of the control unit, starts a voltage regulating operation for the transfer voltage of the connection line in response to the satisfaction of the wake-up condition while using the electric charge of the capacitor of the switching regulator, and produces the supply voltage on the supply line from the intermediate voltage of the connection line produced by the switching regulator in response to the normal operation mode of the control unit, and
wherein the series regulator comprises:
a first series regulator which prohibits, in response to the standby mode of the control unit, an electric current from being transmitted from the connection line to the supply line, starts the voltage regulating operation in response to the satisfaction of the wake-up condition, and produces the supply voltage applied to the supply line from the intermediate voltage of the connection line in response to the normal operation mode of the control unit to supply a third quantity of electric current of the supply voltage to the supply line, a sum of the second and third quantities being equal to the first quantity, the third quantity being larger than the second quantity; and a second series regulator which produces the supply voltage applied to the supply line from the input voltage of the input line to supply the second quantity of electric current of the supply voltage to the supply line.

2. The electronic control system according to claim 1, wherein the voltage drop type switching regulator comprises:

a switching element, having an input terminal connected with the input line and an output terminal, which performs the switching operation to change the input voltage applied to the input terminal to a resultant voltage applied to the output terminal;

a smoothing circuit, having the capacitor with a first terminal connected with both the output terminal of the switching element and a connection line and a second terminal set at a certain voltage lower than the intermediate voltage, which smoothes the resultant voltage of the switching element to set the connection line at a smoothed voltage; and a switching element control unit which locks the switching element to an on state in response to the standby mode of the control unit to apply the input voltage of the input terminal to the connection line, controls the switching element, in response to the satisfaction of the wake-up condition in the control unit, to start performing the switching operation and to change the transfer voltage of the connection line to the smoothed voltage, and adjusts the smoothed voltage of the connection line to the intermediate voltage in response to the normal operation mode of the control unit.

3. The electronic control system according to claim 2, wherein the switching regulator of the power supply unit further comprises:

a bootstrap circuit which generates a boot voltage higher than the input voltage when the switching element is turned on under control of the switching element control unit, wherein the switching element control unit controls the switching operation of the switching element while using the boot voltage.

4. The electronic control system according to claim 1, wherein the first series regulator comprises:

an output transistor, having an input terminal connected with the connection line and an output terminal connected with the supply line, which performs a driving operation for an electric current supplied to the input terminal to supply a resultant electric current to the output terminal; and an output transistor control unit which locks the output transistor to an off-state in response to the standby mode of the control unit and controls the driving operation of the output transistor in response to the satisfaction of the wake-up condition to start the voltage regulating operation, and produces the supply voltage applied to the supply line from the intermediate voltage of the connection line in response to the normal operation mode of the control unit.

5. The electronic control system according to claim 1, wherein the standby mode of the control unit is transferred to the normal operation mode in response to an elapse of a transfer period of time starting from the satisfaction of the wake-up condition, the switching element control unit adjusts the smoothed voltage of the connection line to the intermediate voltage until the elapse of the transfer period of time, and the series regulator produces the supply voltage applied to the supply line from the intermediate voltage of the connection line until the elapse of the transfer period of time.

6. The electronic control system according to claim 1, wherein the system is disposed in a vehicle.

7. The electronic control system according to claim 6, wherein the control unit controls electric power supplied from the external power source to a device of the vehicle.

8. A electronic control system comprising:

a power supply unit which receives an input voltage from an external power source through an input line and produces a supply voltage lower than the input voltage from the input voltage; and a control unit which is transferred from a standby mode to a normal operation mode in response to satisfaction of a wake-up condition, receives a first quantity of electric current set at the supply voltage from the power supply unit through a supply line in the normal operation mode to consume the first quantity of electric current, and receives a second quantity of electric current of the supply voltage from the power supply unit through the supply line in the standby mode to consume the second quantity of electric current, the second quantity being smaller than the first quantity, wherein the power supply unit comprises:

a voltage drop type switching regulator, having a capacitor, which applies the input voltage of the input line to a connection line in response to the standby mode of the control unit while accumulating electric charge in the capacitor, starts performing a switching operation in response to the satisfaction of the wake-up condition in the control unit to produce a transfer voltage on the connection line from the input voltage of the input line and to adjust the transfer voltage to an intermediate voltage, and performs the switching operation in response to the normal operation mode of the control unit to produce the intermediate voltage on the connection line from the input voltage of the input line; and a series regulator which produces the supply voltage on the supply line from either the input voltage of the input line or the input voltage of the connection line applied by the switching regulator in case of the standby mode of the control unit, starts a voltage regulating operation for the transfer voltage of the connection line in response to the satisfaction of the wake-up condition while using the electric charge of the capacitor of the switching regulator, and produces the supply voltage on the supply line from the intermediate voltage of the connection line produced by the switching regulator in response to the normal operation mode of the control unit, and wherein the series regulator comprises:

an output transistor, having an input terminal connected with the connection line and an output terminal connected with the supply line, which performs a driving operation for an electric current supplied to the input terminal to output a resultant electric current to the output terminal;

a lower current supply control circuit which controls the driving operation of the output transistor in response to the standby mode of the control unit to produce the supply voltage applied to the output terminal of the output transistor from the input voltage of the input terminal of the output transistor, and to supply the second quantity of electric current of the supply voltage to the supply line; and a higher current supply control circuit which controls the driving operation of the output transistor in response to the satisfaction of the wake-up condition to start the voltage regulating operation, and produces the supply voltage applied to the output terminal of the output transistor from the intermediate voltage of the connection line in response to the normal operation mode of the control unit to supply the first quantity of electric current of the supply voltage to the supply line.

9. The electronic control system according to claim 8 wherein the voltage drop type switching regulator comprises:

a switching element, having an input terminal connected with the input line and an output terminal, which performs the switching operation to change the input voltage applied to the input terminal to a resultant voltage applied to the output terminal;

a smoothing circuit, having the capacitor with a first terminal connected with both the output terminal of the switching element and a connection line and a second terminal set at a certain voltage lower than the intermediate voltage, which smoothes the resultant voltage of the switching element to set the connection line at a smoothed voltage; and a switching element control unit which locks the switching element to an on state in response to the standby mode of the control unit to apply the input voltage of the input terminal to the connection line, controls the switching element, in response to the satisfaction of the wake-up condition in the control unit, to start performing the switching operation and to change the transfer voltage of the connection line to the smoothed voltage, and adjusts the smoothed voltage of the connection line to the intermediate voltage in response to the normal operation mode of the control unit.

10. A power supply unit which receives an input voltage from an external power source through an input line, produces a supply voltage lower than the input voltage from the input voltage, supplies a first quantity of electric current set at the supply voltage to a control unit set in a normal operation mode through a supply line, and supplies a second quantity of electric current set at the supply voltage to the control unit set in a standby mode through the supply line, the standby mode of the control unit being transferred to the normal operation mode in response to cancellation of the standby mode, the second quantity being smaller than the first quantity, comprising:

a voltage drop type switching regulator, having a capacitor, which applies the input voltage of the input line to a connection line in response to the standby mode of the control unit while accumulating electric charge in the capacitor, starts performing a switching operation in response to the cancellation of the standby mode in the control unit to produce a transfer voltage on the connection line from the input voltage of the input line and to adjust the transfer voltage to an intermediate voltage, and performs the switching operation in response to the normal operation mode of the control unit to produce the intermediate voltage on the connection line from the input voltage of the input line; and a series regulator which produces the supply voltage on the supply line from either the input voltage of the input line or the input voltage of the connection line applied by the switching regulator in case of the standby mode of the control unit, starts a voltage regulating operation for the transfer voltage of the connection line in response to the cancellation of the standby mode in the control unit while using the electric charge of the capacitor of the voltage drop type switching regulator, and produces the supply voltage on the supply line from the intermediate voltage of the connection line produced by the switching regulator in response to the normal operation mode of the control unit wherein the series regulator comprises:

a first series regulator which prohibits, in response to the standby mode of the control unit, an electric current from being transmitted from the connection line to the supply line, starts the voltage regulating operation in response to the cancellation of the standby mode in the control unit, and produces the supply voltage applied to the supply line from the intermediate voltage of the connection line in response to the normal operation mode of the control unit to supply a third quantity of electric current of the supply voltage to the supply line, a sum of the second and third quantities being equal to the first quantity, the third quantity being larger than the second quantity; and a second series regulator which produces the supply voltage applied to the supply line from the input voltage of the input line to supply the second quantity of electric current of the supply voltage to the supply line.

11. The power supply unit according to claim 10, wherein the voltage drop type switching regulator comprises:

a switching element, having an input terminal connected with the input line and an output terminal, which performs the switching operation to change the input voltage applied to the input terminal to a resultant voltage applied to the output terminal;

a smoothing circuit, having the capacitor with a first terminal connected with both the output terminal of the switching element and a connection line and a second terminal set at a certain voltage lower than the intermediate voltage, which smoothes the resultant voltage of the switching element to set the connection line at a smoothed voltage; and a switching element control unit which locks the switching element to an on state in response to the standby mode of the control unit to apply the input voltage of the input terminal to the connection line, controls the switching element, in response to the cancellation of the standby mode, to start performing the switching operation and to change the transfer voltage of the connection line to the smoothed voltage, and adjusts the smoothed voltage of the connection line to the intermediate voltage in response to the normal operation mode of the control unit.

12. The power supply unit according to claim 11, wherein the switching regulator of the power supply unit further comprises:

a bootstrap circuit which generates a boot voltage higher than the input voltage, when the switching element is turned on, under control of the switching element control unit, wherein the switching element control unit controls the switching operation of the switching element while using the boot voltage.

13. The power supply unit according to claim 10, wherein the first series regulator comprises:

an output transistor, having an input terminal connected with the connection line and an output terminal connected with the supply line, which performs a driving operation for an electric current supplied to the input terminal to supply a resultant electric current to the output terminal; and an output transistor control unit which locks the output transistor to an off-state in response to the standby mode of the control unit, controls the driving operation of the output transistor in response to the cancellation of the standby mode in the control unit to start the voltage regulating operation, and produces the supply voltage applied to the supply line from the intermediate voltage of the connection line in response to the normal operation mode of the control unit.

14. The power supply unit according to claim 10, wherein the first series regulator has a plurality of third series regulators serially connected with one another, and each third series regulator prohibits, in response to the standby mode of the control unit, an electric current from being transmitted from the connection line to the supply line, starts the voltage regulating operation in response to the cancellation of the standby mode in the control unit, and produces the supply voltage applied to the supply line from the intermediate voltage of the connection line to supply an electric current of the supply voltage to the supply line, a sum of quantities of the electric currents supplied from the third series regulators to the supply line being equal to the first quantity.

15. The power supply unit according to claim 10, wherein the standby mode of the control unit is transferred to the normal operation mode in response to an elapse of a transfer period of time starting from the cancellation of the standby mode, the switching element control unit adjusts the smoothed voltage of the connection line to the intermediate voltage until the elapse of the transfer period of time, and the series regulator produces the supply voltage applied to the supply line from the intermediate voltage of the connection line until the elapse of the transfer period of time.

16. A power supply unit which receives an input voltage from an external power source through an input line, produces a supply voltage lower than the input voltage from the input voltage, supplies a first quantity of electric current set at the supply voltage to a control unit set in a normal operation mode through a supply line, and supplies a second quantity of electric current set at the supply voltage to the control unit set in a standby mode through the supply line, the standby mode of the control unit being transferred to the normal operation mode in response to cancellation of the standby mode, the second quantity being smaller than the first quantity, comprising:

a voltage drop type switching regulator, having a capacitor, which applies the input voltage of the input line to a connection line in response to the standby mode of the control unit while accumulating electric charge in the capacitor, starts performing a switching operation in response to the cancellation of the standby mode in the control unit to produce a transfer voltage on the connection line from the input voltage of the input line and to adjust the transfer voltage to an intermediate voltage, and performs the switching operation in response to the normal operation mode of the control unit to produce the intermediate voltage on the connection line from the input voltage of the input line; and a series regulator which produces the supply voltage on the supply line from either the input voltage of the input line or the input voltage of the connection line applied by the switching regulator in case of the standby mode of the control unit, starts a voltage regulating operation for the transfer voltage of the connection line in response to the cancellation of the standby mode in the control unit while using the electric charge of the capacitor of the voltage drop type switching regulator, and produces the supply voltage on the supply line from the intermediate voltage of the connection line produced by the switching regulator in response to the normal operation mode of the control unit wherein the series regulator comprises:

an output transistor, having an input terminal connected with the connection line and an output terminal connected with the supply line, which performs a driving operation for an electric current supplied to the input terminal to output a resultant electric current to the output terminal;

a lower current supply control circuit which controls the driving operation of the output transistor in response to the standby mode of the control unit to produce the supply voltage applied to the output terminal of the output transistor from the input voltage of the input terminal of the output transistor and to supply the second quantity of electric current of the supply voltage to the supply line; and a higher current supply control circuit which controls the driving operation of the output transistor in response to the cancellation of the standby mode in the control unit to start the voltage regulating operation, and produces the supply voltage applied to the output terminal of the output transistor from the intermediate voltage of the connection line in response to the normal operation mode of the control unit to supply the first quantity of electric current of the supply voltage to the supply line.

17. The power supply unit according to claim 16, wherein the voltage drop type switching regulator comprises:

a switching element, having an input terminal connected with the input line and an output terminal, which performs the switching operation to change the input voltage applied to the input terminal to a resultant voltage applied to the output terminal;

a smoothing circuit, having the capacitor with a first terminal connected with both the output terminal of the switching element and a connection line and a second terminal set at a certain voltage lower than the intermediate voltage, which smoothes the resultant voltage of the switching element to set the connection line at a smoothed voltage; and a switching element control unit which locks the switching element to an on state in response to the standby mode of the control unit to apply the input voltage of the input terminal to the connection line, controls the switching element, in response to the cancellation of the standby mode, to start performing the switching operation and to change the transfer voltage of the connection line to the smoothed voltage, and adjusts the smoothed voltage of the connection line to the intermediate voltage in response to the normal operation mode of the control unit.

* * * * *